United States Patent
Kanonakis et al.

(10) Patent No.: US 9,967,188 B2
(45) Date of Patent: May 8, 2018

(54) NETWORK TRAFFIC FLOW MANAGEMENT USING MACHINE LEARNING

(71) Applicant: NEC Laboratories America, Inc., Princeton, NJ (US)

(72) Inventors: Konstantinos Kanonakis, New Brunswick, NJ (US); Yawei Yin, Foster City, CA (US); Mahmoud Sayed, Hyattsville, MD (US)

(73) Assignee: NEC Corporation (JP)

( * ) Notice: Subject to any disclaimer, the term of this patent is extended or adjusted under 35 U.S.C. 154(b) by 275 days.

(21) Appl. No.: 14/844,855

(22) Filed: Sep. 3, 2015

(65) Prior Publication Data
US 2016/0105364 A1 Apr. 14, 2016

Related U.S. Application Data

(60) Provisional application No. 62/063,118, filed on Oct. 13, 2014.

(51) Int. Cl.
*H04L 12/801* (2013.01)
*H04L 12/851* (2013.01)

(52) U.S. Cl.
CPC .......... *H04L 47/10* (2013.01); *H04L 47/127* (2013.01); *H04L 47/2441* (2013.01)

(58) Field of Classification Search
None
See application file for complete search history.

(56) References Cited

U.S. PATENT DOCUMENTS

| 8,418,249 B1* | 4/2013 | Nucci .................. G06F 21/552 706/20 |
| 2010/0142410 A1* | 6/2010 | Huynh Van ......... H04L 12/4633 370/255 |
| 2014/0115706 A1 | 4/2014 | Silva et al. |
| 2014/0189074 A1* | 7/2014 | Parker ..................... H04L 63/20 709/220 |
| 2015/0229618 A1* | 8/2015 | Wan ....................... H04L 63/162 726/26 |

OTHER PUBLICATIONS

Al_Fares, et al., "Hedera: Dynamic Flow Scheduling for Data Center Networks" NSDI Proceedings of the 7th USENIX Conference on Networked Systems Design and Implementation, Apr. 2010, 15 pages. pp. 19-19.

(Continued)

*Primary Examiner* — Huy D Vu
*Assistant Examiner* — Bao G Nguyen
(74) *Attorney, Agent, or Firm* — Joseph Kolodka (57) ABSTRACT

A system and method for management of network traffic flow for one or more networks of interconnected computing devices, including predicting one or more types of network traffic data flows using a Machine Learning (ML) classifier, and updating the ML classifier according to identified changes in the network traffic data flows. Using software-defined-networking (SDN) tools and an updated ML classifier, training data is generated to formulate accurate new predictions of the one or more types of network traffic data flows. Network traffic flow is regulated based on the generated new predictions.

20 Claims, 5 Drawing Sheets

(56) References Cited

OTHER PUBLICATIONS

Benson, et al., "Network Traffic Characteristics of Data Centers in the Wild", Internet Measurement Conference, Nov. 2010, 14 pages.
Jain, et al., "B4: Experience With a Globally-Deployed Software Defined WAN." Proceedings of the ACM SIGCOMM 2013 Conference, Aug. 2013, pp. 3-14.
Kandula, et al., The Nature of Data Center Traffic: Measurements and Analysis, Internet Measurement Conference, Nov. 2009, 7 pages.
McKeown et al., "OpenFlow: Enabling Innovation in Campus Networks." ACM SIGCOMM Computer Communication Review, Apr. 2008, p. 69-74, vol. 38, No. 2.
Peng, et al., "Hadoopwatch: A First Step Towards Comprehensive Traffic Forecasting in Cloud Computing,", in IEEE INFOCOM, May 2014, 9 pages.
Shao, et al., "Emilie: Enhance the power of traffic identification", 2014 International Conference on Computing, Networking and Communications, Communications and Information Security Symposium, Feb. 2014 pp. 31-35.
Wang, et al., "c-Through: Part-Time Optics in Data Centers." ACM SIGCOMM Computer Communication Review, ACM, Aug. 2010, pp. 327-338, vol. 40. No. 4.

\* cited by examiner

NETWORK TRAFFIC FLOW MANAGEMENT USING MACHINE LEARNING

RELATED APPLICATION INFORMATION

This application claims priority to provisional application No. 62/063,118 filed Oct. 13, 2014, the contents of which are incorporated herein by reference.

BACKGROUND OF THE INVENTION

Technical Field

The present invention relates generally to network traffic flow management, and more particularly, to network traffic flow prediction and regulation using machine learning.

Description of the Related Art

In computer networks, traffic flow behavior may exhibit a characteristic commonly known as "elephant-mice" flows. For example, in relevant sampling performed across different types of networks (e.g., data center networks, hybrid networks, software-defined networks (SDN), etc.), the majority of traffic flows (e.g., ~80%) are conventionally small (e.g., less than 10 KB), although the majority of bytes transferred within a network are in the top 10% of large flows. Thus, the former flows (e.g., smaller than 10 KB) may be referred to as "mice" while the latter (e.g. large flows) may be referred to as "elephants".

The elephants-mice flow feature is associated with abnormal network behavior and can cause application level performance degradation in data centers and other types of networks, and the detection of elephant flows in a network given a lack of explicit signaling from the flow-generating applications (which is the typical case) is not a trivial task in network management. Generally speaking, the elephant flow detection problem is related to the IP traffic classification problem, which tries to identify the application layer protocol (e.g. HTTP, P2P, VOIP, etc.) of each flow given the flow parameters such as TCP/IP ports, packet length and inter packet gap.

One conventional method for IP traffic classification involves examining flow ports and matching them to the standard ports defined by IANA (Internet Assigned Numbers Authority). However, a drawback of this approach is that some applications hide these flow ports and/or pass through a firewall by using these ports. Moreover, some applications use arbitrary ports for their connections, which would cause this method to fail. Another approach is based on payload inspection, which tries to match packet contents and/or signatures to well-known applications. This approach maintains updated information of application protocol changes, but it does not work if the packets are encrypted and/or if user privacy is desired to be maintained.

SUMMARY

A computer implemented method for management of network traffic flow for one or more networks of interconnected computing devices, including predicting one or more types of network traffic data flows using a Machine Learning (ML) classifier, and updating the ML classifier according to identified changes in the network traffic data flows. Using software-defined-networking (SDN) tools and an updated ML classifier, training data is generated to formulate accurate new predictions of the one or more types of network traffic data flows. Network traffic flow is regulated based on the generated new predictions.

A system for management of network traffic flow for one or more networks of interconnected computing devices, including a Machine Learning (ML) classifier to predict one or more types of network traffic data flows. The ML classifier is updated according to identified changes in the network traffic data flows, and software-defined-networking (SDN) tools are employed to train and update the ML classifier. Training data generated by the SDN tools is employed to formulate accurate new predictions of the one or more types of network traffic data flows, and a regulator controls network traffic flow based on the generated new predictions.

A computer-readable storage medium including a computer-readable program, wherein the computer-readable program when executed on a computer causes the computer to perform the steps of predicting one or more types of network traffic data flows in a network of interconnected computers using a Machine Learning (ML) classifier, and updating the ML classifier according to identified changes in the network traffic data flows. Using software-defined-networking (SDN) tools and an updated ML classifier, training data is generated to formulate accurate new predictions of the one or more types of network traffic data flows. Network traffic flow is regulated based on the generated new predictions.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to systems and methods for network traffic flow prediction and regulation using machine learning. In a particularly useful embodiment, the present principles may be employed for data traffic flow type prediction in Software-Defined Networks (SDNs) using machine learning according to the present principles. The present principles may detect elephant and/or mice flows using Machine Learning (ML) classifiers to predict the type of data traffic flows (e.g., elephants, mice, etc.) In contrast to conventional approaches, the present principles do not necessarily operate on a per-packet basis, but rather may operate on aggregate flow statistics, which are generally readily available through the use of an SDN framework. Moreover, the present principles may employ a plurality of input (e.g., additional statistics) to further improve prediction accuracy according to various embodiments.

In one embodiment, the present principles are application agnostic (e.g., function for all applications), and may operate using any ML classification method, which allows flexibility to select an optimal technique for a given network traffic mix. The present principles may be applied to network traffic data without significantly increasing the number of features needed to construct a specific classifier, thus reducing the complexity of the learning and prediction processes.

In one embodiment, the present principles may enable dynamic and/or automatic adaptation of the classification model according to current network conditions. The present principles may also perform traffic-type predictions without incurring measurement overhead, thus improving the utilization of networking resources. In some embodiments, measurements may be introduced, and the measurement overhead may be adjustable to achieve a desired trade-off with prediction accuracy. The system and method according to the present principles does not need to modify the network, as it may be implemented as software run on a centralized SDN controller, but in some embodiments, the present principles may include a hardware controller attached to a network and/or individual hardware computing resources according to various embodiments.

Before describing the present principles in detail, some information regarding networks, and elephant and mice flows will be presented for ease of understanding of various embodiments of the present principles. Elephant flows are conventionally associated with applications generating large file transfers (e.g., virtual machine migrations, data backups, etc.), and mice flows generally originate from bursty and time-sensitive applications (e.g., the control and synchronization messages among hosts of distributed computing platforms). As a result, elephant flows are much more sensitive to network throughput and typically take up as much bandwidth and buffer capacity as is available, while mice are more sensitive to network delay and jitter.

Because of their diverse characteristics and requirements, the co-existence of elephant and mice flows in a network complicates network traffic handling. For example, elephants may occupy most of the buffers at intermediate switches/routers and may increase the queuing delay/jitter of the packets belonging to delay-sensitive mice, but since most of the flows may be bursty and stateless mice flows, traffic engineering (TE) schemes are generally based on equal-cost multi-path (ECMP) routing. ECMP works well on mice, but can hash multiple elephants onto the same path, thereby causing network congestion and adversely affecting overall network performance.

Hybrid networks (e.g., including electrical and optical switches) have recently been implemented with a main application being data center networking. Under such architectures, electrical switches can communicate with one another either in the typical manner (e.g., through other electrical switches) or by forming direct optical circuit interconnections and sending traffic through them by means of optical transceivers. The latter form of connectivity (e.g., forming direct optical circuit interconnections) can offer much higher bandwidth and eliminate intermediate electrical buffering and processing. In that respect, it is well suited for the accommodation of elephant flows, as it ensures high throughput for the elephant flows, and relieves mice from contention. However, for cost reasons, optical paths usually need to be shared in time (e.g., by means of optical switches) among different host pairs. However, since optical link reconfiguration times are considerably high, the use of optical circuits for flows that do not demonstrate elephant characteristics (e.g., long duration, high bandwidth) may severely reduce the utilization of the available optical capacity.

In recent years, Software-Defined Networking (SDN) has been developed, and a feature of SDN is the ability to separate the data and the control planes. In principle, SDN delegates the most complex control layer functionalities to software run at, for example, centralized controllers, while allowing the network equipment (e.g., switches, routers, etc.) to remain relatively simple (e.g., mainly performing the forwarding of data). The communication between controllers and network equipment (e.g. switches) for applying configurations or receiving network status information may be performed via appropriate protocols (e.g. OpenFlow™). Because of its ability to enable simplified control and efficient use of networking resources, SDN has lately been increasingly deployed.

In various embodiments, the present principles may be employed to solve the afore-mentioned issued (e.g., caused by the co-existence of elephant and mice flows). The present principles may be employed to accurately and timely detect the elephant and mice flows. Following detection, different flow types may be handled using a plurality of methods including, for example, employing different scheduling strategies for each flow type, performing different load balancing methods for each flow type, converting elephants into mice by splitting them into smaller chunks of data, and/or routing elephants and mice across the network using separate physical paths (e.g., offload elephant flows into optical circuits) according to various embodiments of the present principles.

Detection of elephant flows in a network given a lack of explicit signaling from the flow-generating applications (which is the typical case) is not a trivial task, and the present principles may be employed effectively to real-world situations. In various embodiments, the system and method (1) may be application-independent, (2) may perform early prediction of elephant flows (e.g., after only a first few packets have arrived), (3) may not require any modification of the network infrastructure (e.g., hosts, switches, etc.), (4) may not introduce additional traffic overhead to the network for measurement purposes, and (5) may be compliant with an SDN paradigm according to the present principles. In one embodiment, the present principles provide a solution for the elephant-mice flow problem by predicting the nature of individual traffic flows using machine learning techniques to satisfy at least the above-mentioned conditions (e.g., (1)-(5)).

It should be understood that embodiments described herein may be entirely hardware or may include both hardware and software elements, which includes but is not limited to firmware, resident software, microcode, etc. In a preferred embodiment, the present invention is implemented in hardware. The present invention may be a system, a method, and/or a computer program product. The computer program product may include a computer readable storage medium (or media) having computer readable program instructions thereon for causing a processor to carry out aspects of the present invention.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
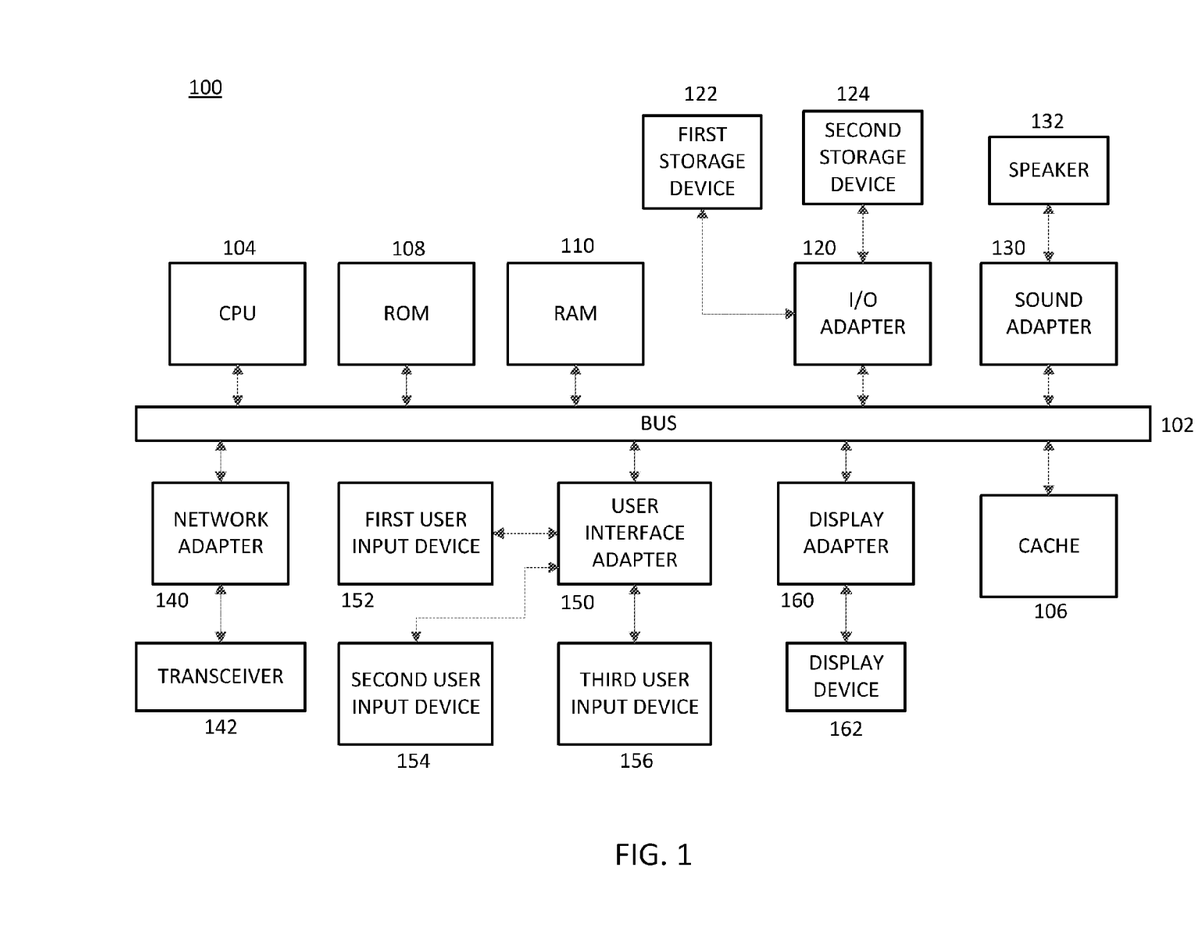
FIG. 1 shows an exemplary processing system to which the present principles may be applied, in accordance with an embodiment of the present principles.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200 and 500 described below with respect to FIGS. 2 and 5, respectively, are systems for implementing respective embodiments of the present principles. Part or all of processing system 100 may be implemented in one or more of the elements of systems 200 and 500.

Figure 2:
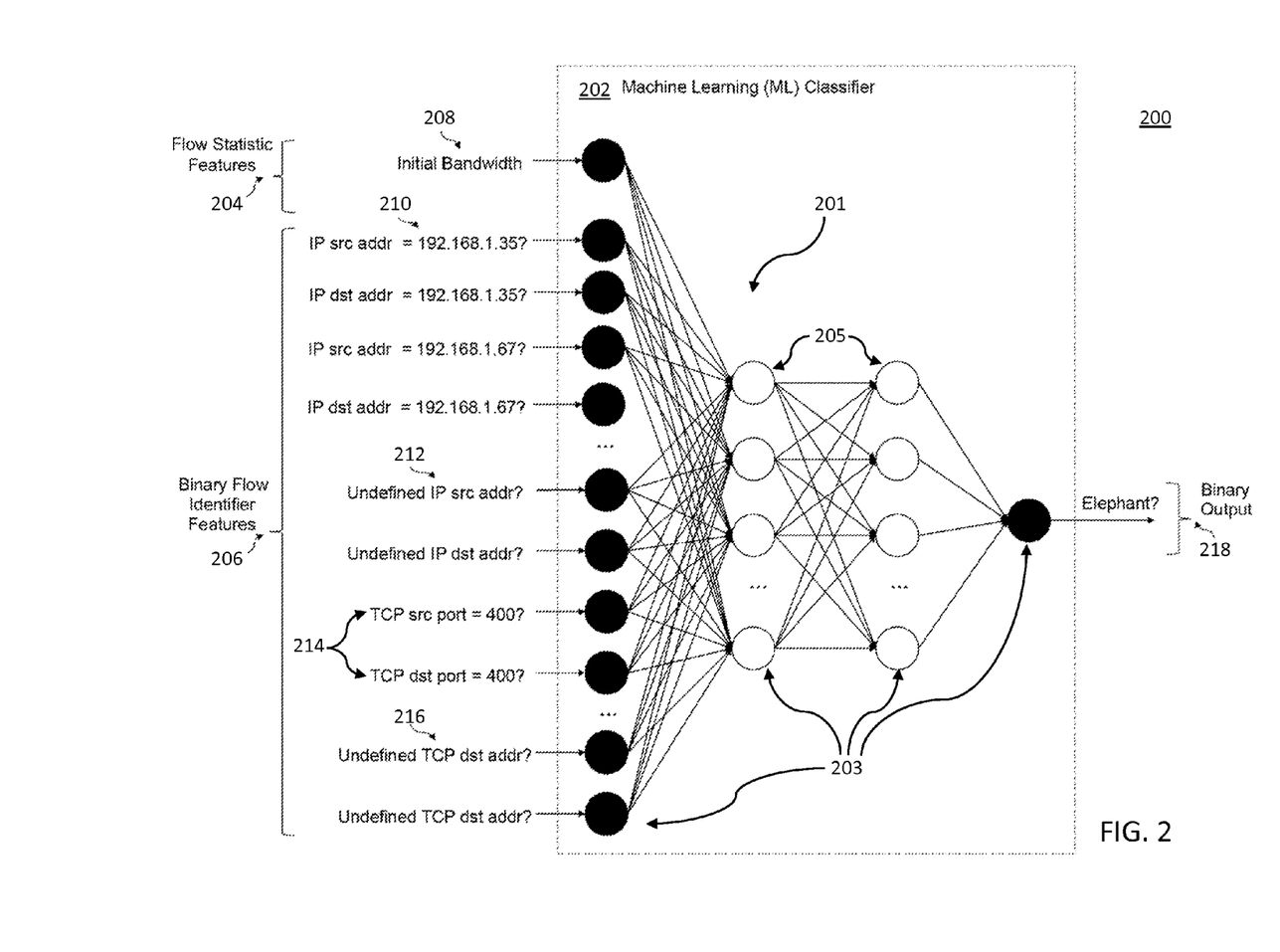
FIG. 2 shows an exemplary system/method for predicting network traffic flow using a Machine Learning (ML) classifier, in accordance with an embodiment of the present principles.
Figure 3:
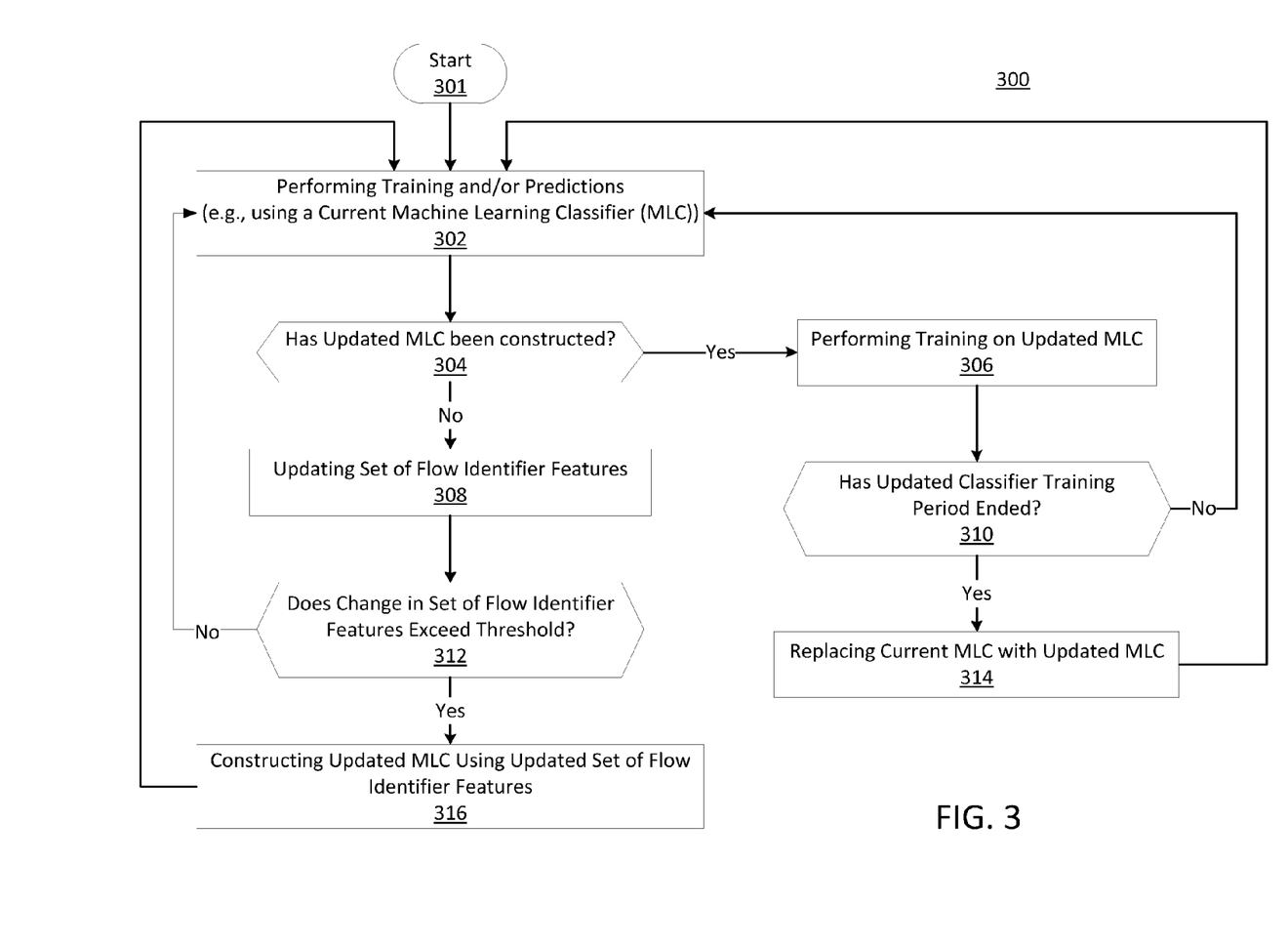
FIG. 3 shows an exemplary method for updating a Machine Learning (ML) classifier for predicting network traffic flow, in accordance with an embodiment of the present principles.
Figure 4:
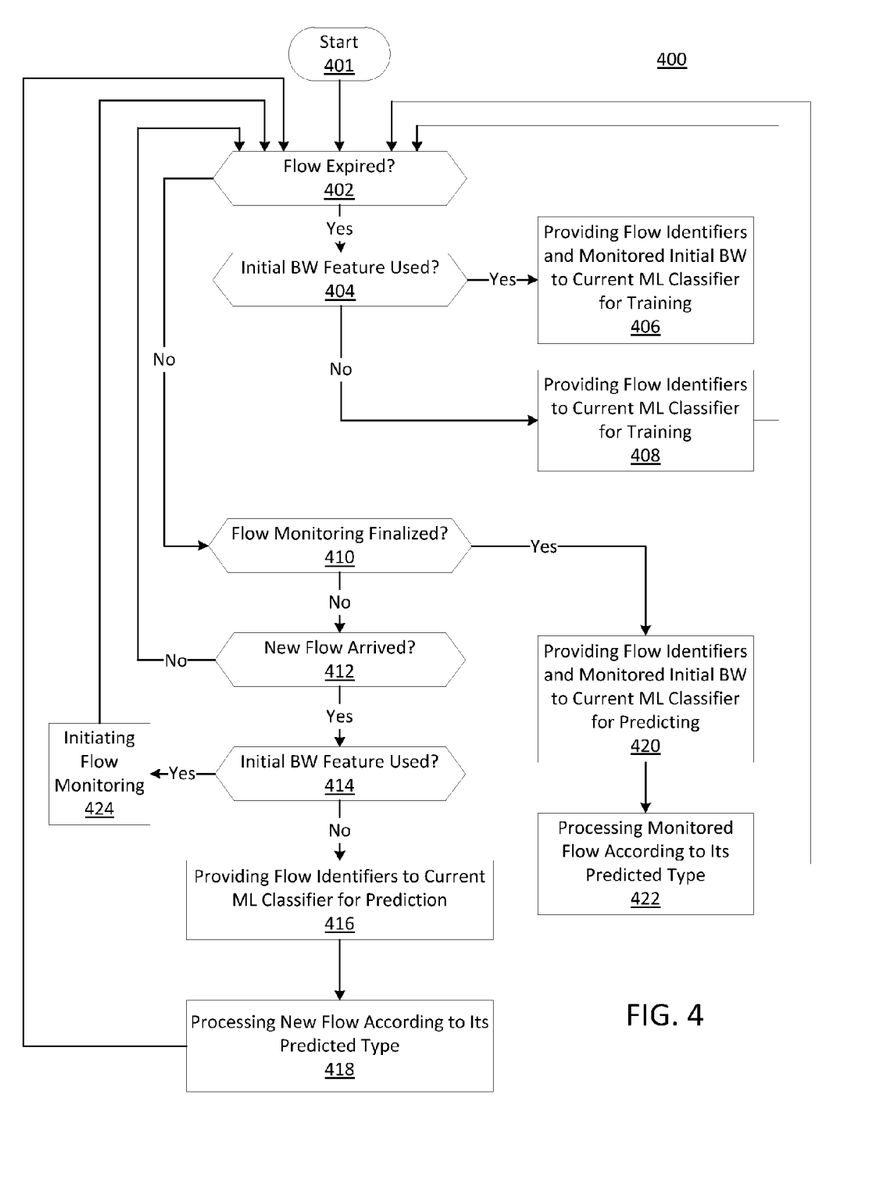
FIG. 4 shows an exemplary method for predicting network traffic flow using a Machine Learning (ML) classifier, in accordance with an embodiment of the present principles.

Further, it is to be appreciated that processing system 100 may perform at least part of the method described herein including, for example, at least part of methods 200, 300, and 400 of FIGS. 2, 3, and 4, respectively. Similarly, part or all of systems 200 and 500 may be used to perform at least part of methods 200, 300, and 400 of FIGS. 2, 3, and 4, respectively.

Referring now to FIG. 2, an exemplary system/method 200 for predicting network traffic flow using a Machine Learning (ML) classifier is illustratively depicted in accordance with an embodiment of the present principles. In one embodiment, a ML classifier may receive input in the form of the values of one or more observed features (e.g., flow statistic features 204, binary flow identifier features 206, etc.) of one or more networks (e.g., neural networks) 201. The input may be processed and transformed into classification/prediction output 216 (e.g., which may include a determined set of categories (e.g., sub-populations) in which each of the one or more features belongs) for predicting network flow types according to the present principles.

In an exemplary embodiment, a Machine Learning (ML) classifier may be employed in a network 201 (e.g., neural network). For example, a neural network with a plurality of nodes 203, and two hidden layers 205 is shown for illustrative purposes in this example, but any type of classifier and/or network of nodes (e.g., physical computing devices, virtual machines, etc.) may be employed according to various embodiments of the present principles. In one embodiment, input features may be separated (e.g., logically, physically, etc.) into flow identifiers 206 and flow statistics 204. The output may be a set of binary outputs 218, which may indicate the category into which the transformed flow has been classified for predicting the traffic flow type (e.g., using limited initial information) according to the present principles. In the simplest case, there may be only one binary output 218, which may indicate whether the flow is classified as an elephant or not.

In an embodiment, the ML classifier 202 may be trained using data (e.g., flow identifiers 206 and statistics 204, as described in further detail herein below), and the data may be obtained when flows expire according to the present principles. A reason is that in SDN frameworks (e.g. OpenFlow™), this capability is readily available and thus, measuring (e.g., measuring overhead) may not be necessary.

In an embodiment, flow identifiers 206 may be any combination of Layer 2/Layer 3/Layer 4 (L2/L3/L4) protocol field values (or even fields belonging to higher layers), as long as the SDN control framework used provides visibility to those fields. The flow identifiers 206 may be employed for defining a flow, and are distinct from flow statistics 204. For example, a basic set of flow identifiers 206 may include IP source and destination addresses 210, destination address 216, and/or TCP source and destination ports 214 of a flow according to various embodiments. However, additional fields (e.g. VLAN identifiers) may be used in accordance with the present principles. In some embodiments, a reduced set of identifiers may be employed. For example, instead of defining flows using the 4-tuple of features (e.g., identifiers) described above, flows might only be defined using IP source and destination addresses according to some embodiments.

In one embodiment, flow statistics 204 may include information that may vary (e.g., even for flows having otherwise the same or a similar set of identifiers). In one embodiment, an initial Bandwidth (BW) feature 208 (e.g., average BW of the flow from its beginning to a particular later point in time) may be employed as input to the ML classifier/predictor 202. In one embodiment, the initial BW feature 208 may be employed because it may indicate a nature of the flow (e.g., elephant flows may be characterized by average bandwidths higher than that of mouse flows by, for example, several orders of magnitude), and the initial BW feature 208 may be determined when flows expire (e.g., by dividing the total number of bytes in a flow by the flow duration, (e.g., data which may be provided by SDN frameworks) according to the present principles.

In an embodiment, although the above information may be employed during training, newly arriving flows may be processed differently (e.g., as no flow BW statistic may be available upon flow arrival). Thus, to provide a corresponding input feature, the flow may be measured (e.g., for a limited duration) to obtain the initial BW feature 208. This may improve the ML classifier prediction accuracy (e.g., because longer measurement duration may result in more accurate indications of the ultimate average BW of the flow), but may cause additional costs to be incurred (e.g., in terms of delaying the classification, thereby postponing appropriate treatment of flows) according to various embodiments of the present principles. As such, the use of such measuring (e.g., for a limited duration) may be an optional step, and the duration of the initial BW measurement may be a configurable parameter in some embodiments of the present principles.

In an embodiment, flow identifier features 206 may include nominal data (e.g., values of such features do not have a quantitative meaning), and as such, distances between different values do not have a particular significance. For example, TCP source ports 25 and 30 may not be more related to each other than TCP source ports 25 and 3000. A reason is that even TCP port values that are close to one another may be used by completely different applications. The same may be true for IP addresses (e.g., even neighboring IP addresses may correspond to completely different types of traffic depending on the applications running on the particular machines). As such, such features may be introduced to the ML classifier as binary inputs according to the present principles. Under this approach, there would be one feature for each potential value of a flow identifier (e.g. TCP source port 214, IP source addresses 210, etc.).

In one embodiment, upon classification of a flow (or training of the classifier using a flow), this particular feature would be given the value "true" if the value of the particular field of the flow matches the value corresponding to the feature (e.g. if the flow's TCP source port equals 25) and would be given the value "false" otherwise. As this may potentially lead to a very large number of features (e.g. 65,536 possible TCP ports), the present principles may be employed to identify one or more sets of "useful" values, (e.g. IP addresses that appear frequently in a particular network instance, or TCP ports that are associated to particular applications, and are not randomly generated by end hosts). For example, considering a particular network where computer hosts have been assigned the IP addresses in the range, for example, 192.168.1.1 to 192.168.1.254, and only the HTTP application is running with HTTP servers listening to TCP port 80. In this embodiment, the classifier may consider only IP addresses 192.168.1.1 to 192.168.1.254 and TCP port 80 as "useful" (e.g., appearing either as source or destination addresses/ports respectively) while all other values may be considered as "undefined" according to the present principles.

For example, with respect to the TCP ports 214, a particular TCP port may be included in the set of useful values if a particular TCP port appears in flows more than a predefined number of times (e.g., above a pre-determined threshold), and each time (e.g., iteration) the particular TCP port may be associated with another IP source-destination pair according to an embodiment of the present principles.

In one embodiment, if, during the training or classification (described in further detail herein below), a particular flow identifier value does not correspond to any of the determined/identified useful flow identifiers, the particular flow identifier may be fed into a special "undefined" feature 212, 216, which may enable training the ML classifier 202 using the rest of the flow's features. For example, in an embodiment, a flow's TCP source and destination ports may be "undefined", but the flow's IP source and destination addresses may be included in the "useful" values list. Then, for this flow (as well as for other flows demonstrating this particular set of TCP/IP values), the classifier may only be biased by the IP addresses when predicting the flow type. The TCP port values may essentially be ignored, as they were not used during training with previous flows according to the present principles.

Referring now to FIG. 3, an exemplary method 300 for updating a Machine Learning (ML) classifier to predict network traffic flow is illustratively depicted in accordance with an embodiment of the present principles. In one embodiment, the useful flow identifiers may change over time (e.g., even within a same network) because of, for example, different applications being executed (in which case the TCP ports may be different), IP addresses being reconfigured, and/or new hosts being introduced into the network. As a result, the flow identifier features used by the classifier may be updated whenever there is a current ML classifier/predictor which is being trained (e.g., incrementally) since they may no longer be relevant (e.g., "useful") for the current network traffic.

For example, particular IP addresses that previously appeared frequently may not currently appear at all, and as such, it may be inefficient to keep them as features in the ML classifier. In one embodiment, the method may receive input and begin in block 301. The training may be performed in block 302 by using, for example, actual network traffic flows, and the training data generated may be employed for predicting one or more flow types and/or managing traffic flows in one or more networks according to various embodiments of the present principles, as described in further detail herein below.

In block 304, it may be determined whether an updated ML classifier has already been constructed according to one embodiment of the present principles. If an updated classifier is determined to have already been constructed (e.g., the method 300 has already performed block 316 without having subsequently performed block 314) in block 304, then training using the same flow data may be performed on this updated classifier in block 306. In one embodiment, for the updated classifier to to provide satisfactory flow prediction performance, it may be trained for a predefined time period in block 306. In one embodiment, the exact duration of this training period in block 306 may depend on the actual traffic patterns and the network on which the method is applied.

For example, if in a particular network, the traffic volume is expected to be relatively low, then a longer training period may be required until the updated classifier replaces the current one. In block 310, if the predefined training time period has ended, the current classifier may be replaced (e.g., on-the-fly) by the updated classifier in block 314. The updated classifier may become (e.g., be transformed into) a current classifier (e.g., replacing the prior current classifier), and the new, updated current classifier may be employed in block 302 for generating a next set of predictions (e.g., traffic flow type predictions), performing training iterations, managing network traffic flow, etc. according to various embodiments of the present principles.

In block 304, if it is determined that an updated classifier (e.g., ML classifier) has not already been constructed (e.g., as described above), then flow data input from block 302 may be employed to update a set of features (e.g., flow identifier features) in block 308 according to the present principles. In one embodiment, the updating of the set of features in block 308 may include, for example, identifying and/or adding new flow identifier features (e.g., new useful features), and/or removing features that are determined to be not useful (e.g., features for which corresponding values have not appeared in any flow within a particular time duration, etc.). For example, a host with a particular IP address may at some point be removed from the network, so the corresponding IP source and IP destination values may also be removed from the set of "useful" features.

In an embodiment, it is checked whether a particular threshold (e.g., in terms of changes in the useful features) has been exceeded in block 312. If the threshold is exceeded, then an updated ML classifier may be generated/constructed using the new set of flow identifier features in block 316. The updated ML classifier that is generated/constructed may then be employed as input for iteratively training in block 306 and subsequently replacing the current classifier in block 314 according to one embodiment of the present principles. In one embodiment, the set of statistic features (e.g., 204 from FIG. 2) may remain unchanged during performance of the method 300 according to the present principles.

In one embodiment, the method 300 for updating the ML classifier may include dynamically updating the set of "useful" features according to the network traffic changes in block 308, and constructing an updated ML classifier if there has been a sufficient change in the said set of features. The specific thresholds for triggering the construction of an updated classifier may depend on the actual traffic patterns and the network on which the method 300 is applied.

For example, if the network structure and traffic type are expected to remain relatively unchanged over time, then the thresholds may be chosen to be lower to make the system more sensitive to occasional changes in the network and/or network traffic. However, in some embodiments, it may not be desirable to update the classifier too frequently (e.g., to take advantage of longer training durations for the current classifier), in which case the thresholds may be set to higher values according to the present principles. The updated ML classifier may be trained in parallel with the current classifier using the same set of data in block 306 according to various embodiments, and the current classifier may be replaced with the updated classifier after a predefined training period has ended according to the present principles.

In one embodiment, the training in blocks 302 and 306 may employ statistics from expired flows through appropriate SDN messages (e.g., using a FLOW_REMOVED OpenFlow™ message) to train an ML classifier without incurring measurement overhead. In one embodiment, flow monitoring statistics may be employed by, for example, sending/receiving appropriate SDN messages (e.g. FLOW_STATS_REQUEST/FLOW_STATS_REPLY OpenFlow™ messages), to obtain measurements of the average flow bandwidth during a configurable initial period. These measurements may be employed for training an ML classifier in block 306 in accordance with one embodiment of the present principles.

Referring now to FIG. 4, an exemplary method 400 for predicting network traffic flow using a Machine Learning (ML) classifier is illustratively depicted in accordance with an embodiment of the present principles. For simplicity of illustration, only the SDN events related to the method 400 (e.g., arrival of new traffic flows, reception of flow statistics and the expiration of existing flows, etc.) are included in FIG. 4. In one embodiment, input may be received, and the method 400 may start in block 401. In one embodiment, it may be checked whether a particular flow (e.g., received as input) has expired in block 402 (e.g., by means of a FLOW_REMOVED OpenFlow™ message).

In one embodiment, if a flow has been determined to be expired in block 402, then it is checked whether an initial BW feature is employed in block 404 before proceeding with ML classifier training in block 408. If it is determined in block 404 that an initial BW feature has been employed, then the training may be performed in block 406 by providing data for at least one of the flow identifiers and/or the initial BW statistic of the flow, the latter already having been collected (as will be described in further detail herein below). Otherwise, only the flow identifiers may be provided for the training in block 408 according to one embodiment of the present principles.

In one embodiment, the expired flows from blocks 406 and 408 may be considered as an elephant for training as long as it exceeds predefined thresholds (e.g., in terms of its duration and average bandwidth). In other words, the method 400 may employ a supervised training process in blocks 406 and 408 according to some embodiments. As mentioned above, the duration may be readily available in SDN frameworks (e.g. included in the FLOW_REMOVED OpenFlow™ messages), while average bandwidth (if not also directly provided) may be calculated using the duration and total byte count statistics according to some embodiments.

In one embodiment, if the check in block 402 determines that a particular flow has not expired (e.g., check failed), it is checked whether the monitoring for a flow has been finalized in block 410. For example, in one embodiment of the present principles, the check in block 410 may be accomplished by the reception of an OpenFlow FLOW_

STATS_REPLY message, following a previous FLOW_STATS_REQUEST. If yes, then the identifiers of the monitored flow, along with the initial BW statistics determined/gathered by the monitoring may be provided as input to the current ML classifier in order to generate a prediction in block 420. Then, the flow may be processed according to its predicted type in block 422, and appropriate actions may be taken (e.g. establishment of certain flow path or scheduling policy) according to the prediction outcome from block 422. In one embodiment, the method 400 may then iterate from block 402 according to various embodiments of the present principles.

In one embodiment, if a new flow is determined to have arrived in block 412, it is first checked whether the initial BW feature is used in block 414. If yes, no prediction for the flow may be made at this stage, and the only action taken may be to initiate monitoring of the flow in block 424 (e.g. as described above). Otherwise, the flow identifiers may be provided to the current ML classifier in order to obtain a prediction in block 416, and the new flow may then be processed and treated according to its predicted type in block 418. In one embodiment, the method 400 may then iterate from block 402 according to various embodiments of the present principles.

In one embodiment, the predicting in blocks 416 and/or 420 may include separating ML classifier inputs into flow identification and/or flow statistic features, employing flow identification features (e.g., binary values) to reduce a feature set size, and using only a limited set of "useful" flow identification feature values (e.g., values expected to appear in a particular network) according to the present principles. In one embodiment, the predicting may include using "undefined" features to enable training and predicting in blocks 416 and/or 420 using flows with identification feature values not corresponding to any of the above-mentioned "useful" values, and the initial average bandwidth of a flow may be employed as an additional feature input to improve prediction accuracy in blocks 416 and 420 according to various embodiments of the present principles.

Figure 5:
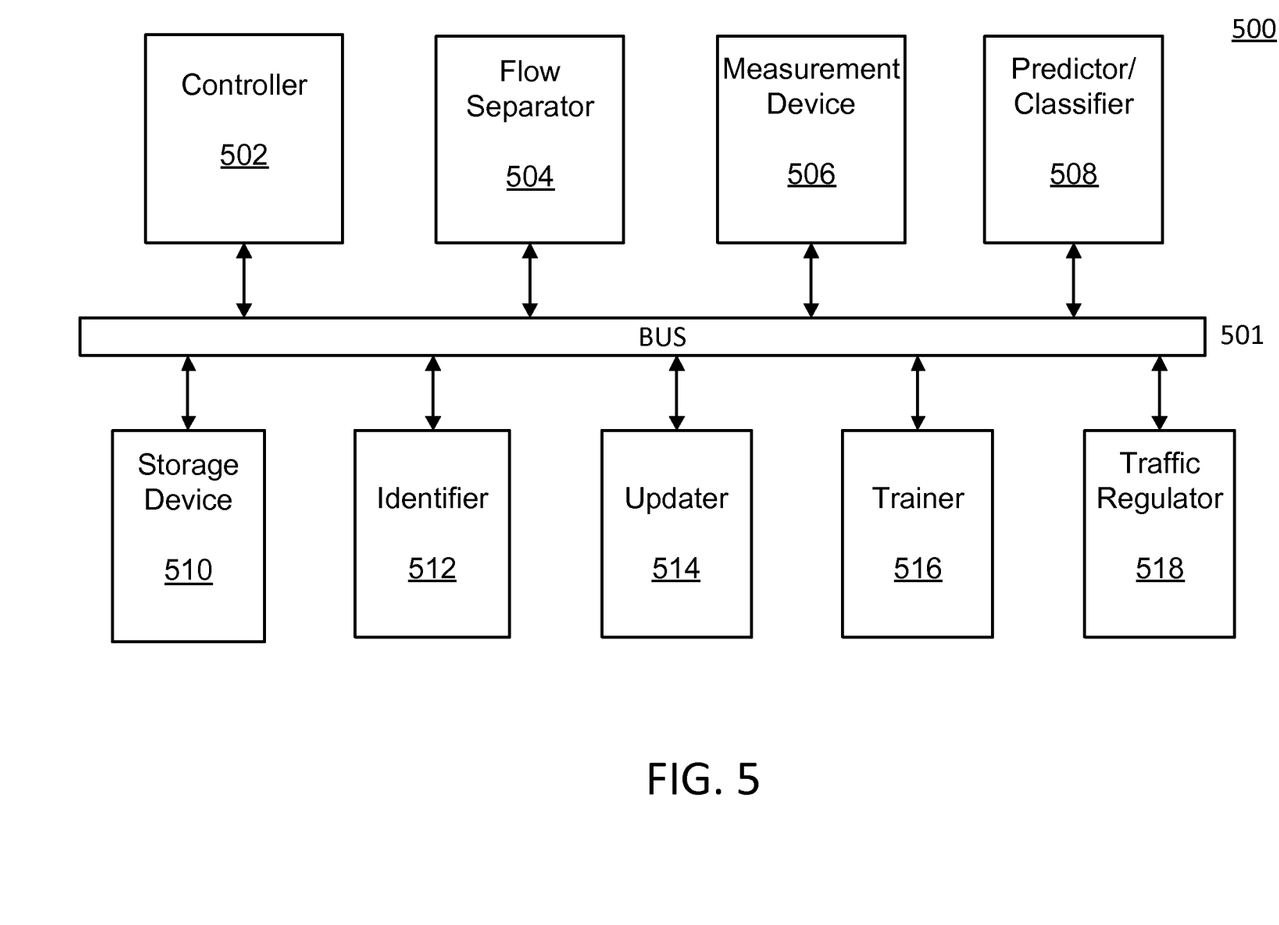
FIG. 5 shows an exemplary system for predicting and managing network traffic flow using a Machine Learning (ML) classifier, in accordance with an embodiment of the present principles.

Referring now to FIG. 5, an exemplary system 500 for predicting and managing network traffic flow using a Machine Learning (ML) classifier is illustratively depicted in accordance with an embodiment of the present principles. In one embodiment, a controller 502 may be connected to a bus 501, and may be employed to control all or part of methods 200, 300, and/or 400 in FIGS. 2,3, and 4, respectively, in addition to controlling systems 100, 200, and/or 500 in FIGS. 1, 2, and 5, respectively, according to various embodiments of the present principles.

While many aspects of system 500 are described in singular form for the sakes of illustration and clarity, the same can be applied to multiples ones of the items mentioned with respect to the description of system 500. For example, while a single measurement device 506 is described, more than one measurement device 506 can be used in accordance with the teachings of the present principles, while maintaining the spirit of the present principles. Moreover, it is appreciated that the measurement device 506 is but one aspect involved with system 500 than can be extended to plural form while maintaining the spirit of the present principles.

The system 500 can include a controller 502, a flow separator 504, a measurement device 506, a predictor/classifier 508, a storage device 510, an identifier 512, an updater 514, a trainer 516, and/or a traffic regulator according to various embodiments of the present principles.

In an embodiment, the flow separator 504 may be employed to separate flows (e.g., logically, physically, etc.) into flow identifiers 206 and flow statistics 204 before being input into a predictor/classifier 508 for ML classification and/or prediction of traffic flows (e.g., traffic flow types) according to the present principles. In one embodiment, a measurement device 506 may be employed for measuring a flow (e.g., for a limited duration) to obtain an initial BW feature (e.g., block 208 of FIG. 2), and the measured data may be stored in a storage device 210. This may improve the ML classifier prediction accuracy (e.g., because longer measurement duration may result in more accurate indications of the ultimate average BW of the flow), but may cause additional costs to be incurred (e.g., in terms of delaying the classification, thereby postponing appropriate treatment of flows) according to various embodiments of the present principles. As such, the use of measurement devices 206 for measuring flows (e.g., for a limited duration) may be an optional step, and the duration of the initial BW measurement may be a configurable parameter in some embodiments of the present principles.

In one embodiment, an identifier 512 may be employed to extract data from traffic flows in the network, and the data may be employed to identify one or more sets of "useful" values (e.g. IP addresses that exist in a particular network instance, TCP ports that are associated to particular applications, and are not randomly generated by end hosts), which may be generated by the predictor/classifier 508 according to some embodiments.

In one embodiment, an updater 514 may be employed for dynamically updating the set of "useful" features according to the network traffic changes (e.g., described in 308 of FIG. 3), and may generate an updated ML classifier if there has been a sufficient change in the said set of features. The updated ML classifier may be trained by a trainer device 516, and may be trained in parallel with the current classifier using the same set of data in block according to various embodiments. The updater 514 may replace (e.g., update) the current classifier with the updated classifier after a predefined training period has ended, and a traffic regulator 518 may regulate data flow traffic based on the updated classifier according to one embodiment of the present principles In the embodiment shown in FIG. 5, the elements thereof are interconnected by a bus 501. However, in other embodiments, other types of connections can also be used. Moreover, in an embodiment, at least one of the elements of system 500 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 500 are readily determined by one of ordinary skill in the art, given the teachings of the present principles provided herein, while maintaining the spirit of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer implemented method for management of network traffic flow for one or more networks of interconnected computing devices, comprising:
   predicting one or more types of network traffic data flows using a Machine Learning (ML) classifier;
   updating the ML classifier according to identified changes in the network traffic data flows, the updating further comprising identifying and removing one or more non-useful network features from a generated set of features;
   using software-defined-networking (SDN) tools and an updated ML classifier, generating training data to formulate accurate new predictions of the one or more types of network traffic data flows, the updated ML classifier being iteratively trained in parallel with a current ML classifier using a same set of input data until a threshold condition has been reached; and
   regulating network traffic flow based on the generated new predictions.

2. The method of claim 1, wherein the network traffic data flows are separated into flow identification features and flow statistic features.

3. The method of claim 2, wherein the flow identification features are transformed into binary values to reduce a feature set size and generate a set of useful flow identification feature values.

4. The method of claim 3, wherein the useful flow identification feature values include feature values expected to be present in a particular network.

5. The method of claim 3, wherein the set of useful flow identification feature values is dynamically updated based on identified changes in the network.

6. The method of claim 1, wherein the updated ML classifier is iteratively trained in parallel with a previous ML classifier using a same set of input data until a threshold condition has been reached.

7. The method of claim 1, wherein undefined features are employed for the predicting and the training.

8. The method of claim 1, further comprising capturing statistics from expired flows using SDN messages to train the ML classifier with minimal measurement overhead.

9. The method of claim 2, wherein the flow monitoring statistics are employed to determine an average flow bandwidth during a configurable initial time period using SDN messages.

10. A system for management of network traffic flow for one or more networks of interconnected computing devices, comprising:
    a Machine Learning (ML) classifier to predict one or more types of network traffic data flows, the ML classifier being updated according to identified changes in the network traffic data flows, the updating further comprising identifying and removing one or more non-useful network features from a generated set of features;
    software-defined-networking (SDN) tools to train and update the ML classifier, wherein training data generated by the SDN tools is employed to formulate accurate new predictions of the one or more types of network traffic data flows, the SDN tools being further configured to iteratively train the updated ML classifier in parallel with a current ML classifier using a same set of input data until a threshold condition has been reached; and
    a regulator to control network traffic flow based on the generated new predictions.

11. The system of claim 10, wherein the network traffic data flows are separated into flow identification features and flow statistic features.

12. The system of claim 11, wherein the flow identification features are transformed into binary values to reduce a feature set size and generate a set of useful flow identification feature values.

13. The system of claim 12, wherein the useful flow identification feature values include feature values expected to be present in a particular network.

14. The system of claim 12, wherein the set of useful flow identification feature values is dynamically updated based on identified changes in the network.

15. The system of claim 10, wherein the updated ML classifier is iteratively trained in parallel with a previous ML classifier using a same set of input data until a threshold condition has been reached.

16. The system of claim 10, wherein undefined features are employed as input for the ML classifier and the trainer.

17. The system of claim 10, the identifier being further configured to capture statistics from expired flows using SDN messages to train the ML classifier with minimal measurement overhead.

18. The system of claim 11, wherein the flow monitoring statistics are employed to determine an average flow bandwidth during a configurable initial time period using SDN messages.

19. A computer-readable storage medium comprising a computer readable program, wherein the computer readable program when executed on a computer causes the computer to perform the steps of:
    predicting one or more types of network traffic data flows in a network of interconnected computers using a Machine Learning (ML) classifier;
    updating the ML classifier according to identified changes in the network traffic data flows, the updating further comprising identifying and removing one or more non-useful network features from a generated set of features;
    using software-defined-networking (SDN) tools and an updated ML classifier, generating training data to formulate accurate new predictions of the one or more types of network traffic data flows, the updated ML classifier being iteratively trained in parallel with a current ML classifier using a same set of input data until a threshold condition has been reached; and
    regulating network traffic flow based on the generated new predictions.

20. The computer-readable storage medium of claim 19, wherein the network traffic data flows are separated into flow identification features and flow statistic features.

* * * * *